United States Patent
Su et al.

(10) Patent No.: US 10,705,827 B2
(45) Date of Patent: Jul. 7, 2020

(54) METHOD FOR UPDATING SYSTEM INFORMATION OF A COMPUTER DEVICE

(71) Applicant: MITAC COMPUTING TECHNOLOGY CORPORATION, Taoyuan (TW)

(72) Inventors: Chien-Huai Su, Hsinchu (TW); Yi-Tung Huang, Taoyuan (TW); Chia-An Huang, Taoyuan (TW); Yen-Ting Yueh, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 210 days.

(21) Appl. No.: 15/653,260

(22) Filed: Jul. 18, 2017

(65) Prior Publication Data
US 2018/0046450 A1 Feb. 15, 2018

(30) Foreign Application Priority Data
Aug. 10, 2016 (TW) .............................. 105125378 A

(51) Int. Cl.
  *G06F 8/654* (2018.01)
  *G06F 1/30* (2006.01)
  *G06F 1/3206* (2019.01)

(52) U.S. Cl.
  CPC .............. *G06F 8/654* (2018.02); *G06F 1/30* (2013.01); *G06F 1/3206* (2013.01)

(58) Field of Classification Search
  CPC ........... G06F 8/654; G06F 1/30; G06F 1/3206
  (Continued)

(56) References Cited

U.S. PATENT DOCUMENTS

| | | | | |
|---|---|---|---|---|
| 4,997,288 A | * | 3/1991 | Rosenow | G06F 1/30 380/2 |
| 6,237,091 B1 | * | 5/2001 | Firooz | G06F 8/65 709/222 |

(Continued)

FOREIGN PATENT DOCUMENTS

| | | |
|---|---|---|
| TW | 200631020 A | 9/2006 |
| TW | 200713037 A | 4/2007 |

(Continued)

OTHER PUBLICATIONS

Hicks et al, "Dynamic Software Updating", [Online], 2005, pp. 1049-1096, [Retrieved from internet on May 5, 2020], <https://dl.acm.org/doi/abs/10.1145/1108970.1108971> (Year: 2005).*

(Continued)

*Primary Examiner* — Geoffrey R St Leger
*Assistant Examiner* — Zengpu Wei
(74) *Attorney, Agent, or Firm* — Brinks Gilson & Lione

(57) ABSTRACT

A method for updating system information of a computer device is provided. The computer device includes a baseboard management controller (BMC) and a non-volatile memory. The method includes steps of: a) upon activation of the BMC, determining whether the BMC is in a power on reset (PoR) state, and obtaining current system information that is associated with the computer device; b) when it is determined that the BMC is in the PoR state, determining whether system information stored in the non-volatile memory conforms with the current system information; and c) when the determination made in step b) is negative, storing the current system information in the non-volatile memory.

10 Claims, 3 Drawing Sheets

(58) Field of Classification Search
USPC .................................................. 717/168
See application file for complete search history.

(56) References Cited

U.S. PATENT DOCUMENTS

| | | | |
|---|---|---|---|
| 2007/0055969 A1 | 3/2007 | Yang | |
| 2007/0169088 A1* | 7/2007 | Lambert | G06F 11/0709 717/168 |
| 2008/0072030 A1* | 3/2008 | Karpa | G06F 8/65 713/2 |
| 2010/0125752 A1 | 5/2010 | Chen et al. | |
| 2012/0096253 A1* | 4/2012 | Lu | G06F 9/4401 713/2 |
| 2014/0317612 A1* | 10/2014 | Ayanam | G06F 11/1433 717/171 |
| 2015/0169330 A1* | 6/2015 | Maity | H04L 41/0813 713/1 |
| 2015/0186150 A1* | 7/2015 | Chung | G06F 9/4408 711/103 |
| 2015/0220349 A1* | 8/2015 | Taniguchi | G06F 8/654 713/2 |
| 2016/0026473 A1* | 1/2016 | Bower, III | G06F 9/4401 713/2 |
| 2016/0055068 A1* | 2/2016 | Jeansonne | G06F 3/0629 714/15 |
| 2016/0139645 A1* | 5/2016 | Han | G06F 11/30 713/320 |
| 2016/0328229 A1* | 11/2016 | Christopher | G06F 16/11 |
| 2017/0010884 A1* | 1/2017 | Liu | G06F 8/66 |
| 2017/0131991 A1* | 5/2017 | Su | G06F 8/66 |
| 2017/0168851 A1* | 6/2017 | Lin | G06F 21/44 |
| 2017/0322740 A1* | 11/2017 | Gabryjelski | G06F 3/0685 |

FOREIGN PATENT DOCUMENTS

| | | |
|---|---|---|
| TW | 200903335 A | 1/2009 |
| TW | 201020779 A | 6/2010 |
| TW | 201506795 A | 2/2015 |

OTHER PUBLICATIONS

Jurković et al, "Remote Firmware Update for Constrained Embedded Systems", [Online], 2014, pp. 1019-1023, [Retrieved from internet on May 5, 2020], <https://ieeexplore.ieee.org/stamp/stamp.jsp?tp=&arnumber=6859718> (Year: 2014).*

Gough et al, "BIOS and Management Firmware", [Online], 2015, pp. 153-171, [Retrieved from internet on May 6, 2020], <https://link.springer.com/chapter/10.1007/978-1-4302-6638-9_5> (Year: 2015).*

Taiwanese Search Report mailed in corresponding Taiwanese Application No. 105125378 dated Jul. 6, 2017, (2p).

* cited by examiner

...

METHOD FOR UPDATING SYSTEM INFORMATION OF A COMPUTER DEVICE

CROSS-REFERENCE TO RELATED APPLICATION

This application claims priority of Taiwanese Application No. 105125378, filed on Aug. 10, 2016, which is incorporated by reference in its entirety.

FIELD OF THE TECHNOLOGY

The disclosure relates to a method for updating system information of a computer device.

BACKGROUND

A computer device serving as a server usually includes a central processing unit (CPU) and a baseboard management controller (BMC) for controlling operation of the computer device. The CPU executes a basic input/output system to obtain system information associated with configuration of the computer device during a power-on self-test (POST) process of the computer device. For example, the system information includes configuration information of a dual in-line memory module and peripheral component interconnect. The CPU transmits the system information thus obtained to the BMC via an intelligent platform management interface (IPMI), and the BMC stores the system information in a volatile memory of the BMC. However, the system information stored in the volatile memory is lost when the computer device is restarted or firmware is updated, and thus the BMC may not obtain correct/latest system information. As a consequence, the BMC would control operation of the computer device using a default system information which is inconsistent with the correct/latest system information and thus adversely affect control to the computer device.

SUMMARY

Therefore, an object of the present disclosure is to provide a method for updating system information of a computer device. The computer device includes a baseboard management controller (BMC) and a non-volatile memory electrically coupled to the BMC.

According to one aspect of the present disclosure, the method to be implemented by the BMC and includes steps of: a) upon activation of the BMC, determining whether the BMC is in a power on reset (PoR) state, and receiving current system information that is associated with the computer device; b) when it is determined that the BMC is in the PoR state, determining whether system information that is stored in the non-volatile memory conforms with the current system information; and c) when the determination made in step b) is negative, storing the current system information in the non-volatile memory.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
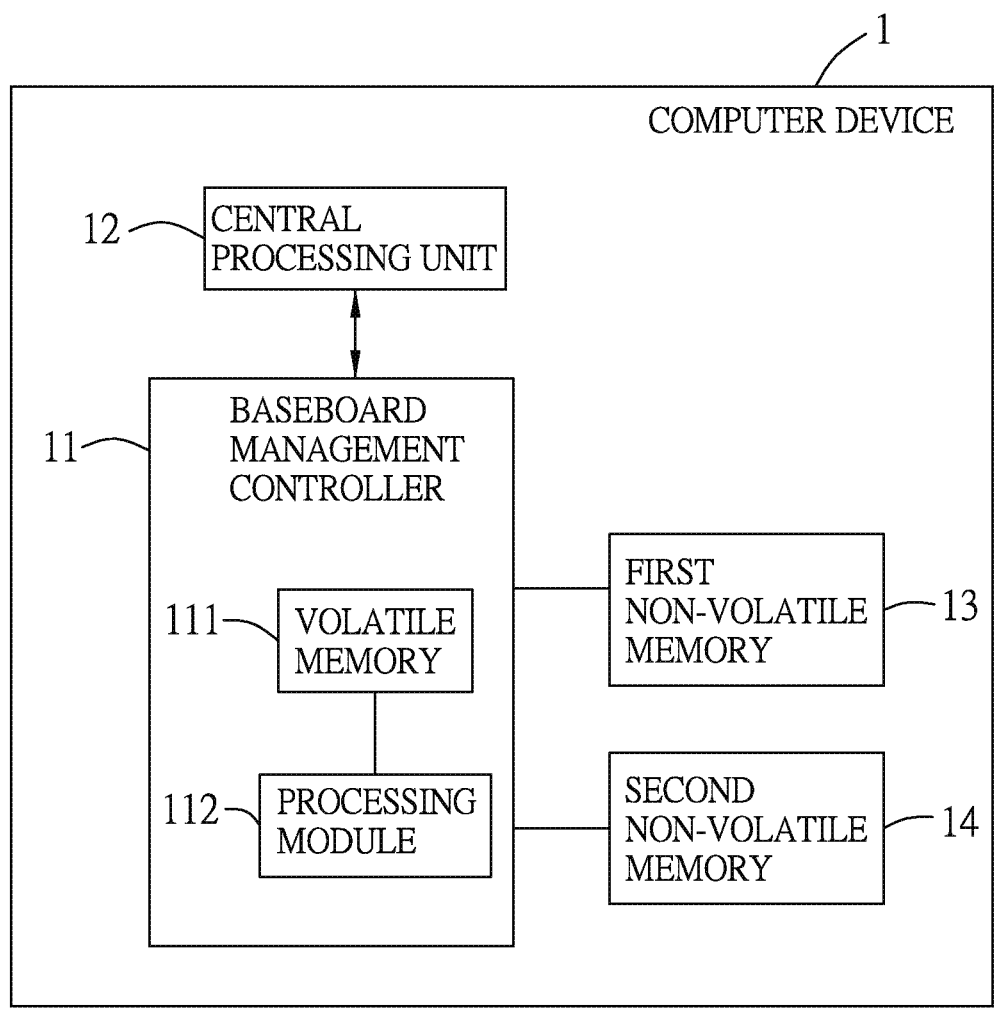
FIG. 1 is a block diagram illustrating a computer device on which a method for updating system information is implemented according to an embodiment of the present disclosure.

Referring to FIG. 1, a computer device 1 includes a baseboard management controller (BMC) 11, a central processing unit (CPU) 12, a first non-volatile memory 13 and a second non-volatile memory 14. The CPU 12, the first non-volatile memory 13 and the second non-volatile memory 14 are electrically connected to the BMC 11. The BMC 11 is configured for implementing a method for updating system information of the computer device 1 according to an embodiment of this disclosure.

In this embodiment, the computer device 1 is a server, and the BMC 11 includes a volatile memory 111 and a processing module 112. In one embodiment, the first non-volatile memory 13 is an electrically-erasable programmable read-only memory (EEPROM) for storing system information associated with configuration of the computer device 1 and configuration information of a field replaceable unit (not shown). The second non-volatile memory 14 is, for example, a flash memory for storing the system information and firmware of the BMC 11. In some embodiments, the volatile memory 111 includes a random access memory for storing the system information. The CPU 12 executes a basic input/output system (BIOS) to obtain the system information. For example, the system information includes configuration information of a dual in-line memory and configuration information of a Peripheral Component Interconnect (PCI) of the computer device 1.

When the supply of power to the computer device 1 is interrupted, the contents stored in the first non-volatile memory 13 and the second non-volatile memory 14 remains unchanged, whereas the contents stored in the volatile memory 111 are lost.

The processing module 112 of the BMC 11 includes a chip register (not shown) for storing a power on reset (PoR) flag with one of first and second flag values to indicate whether the BMC 11 is in a PoR state. In this embodiment, the first flag value indicates that the BMC 11 is in the PoR state while the second flag value different from the first flag value indicates that the BMC 11 is not in the PoR state.

Figure 2:
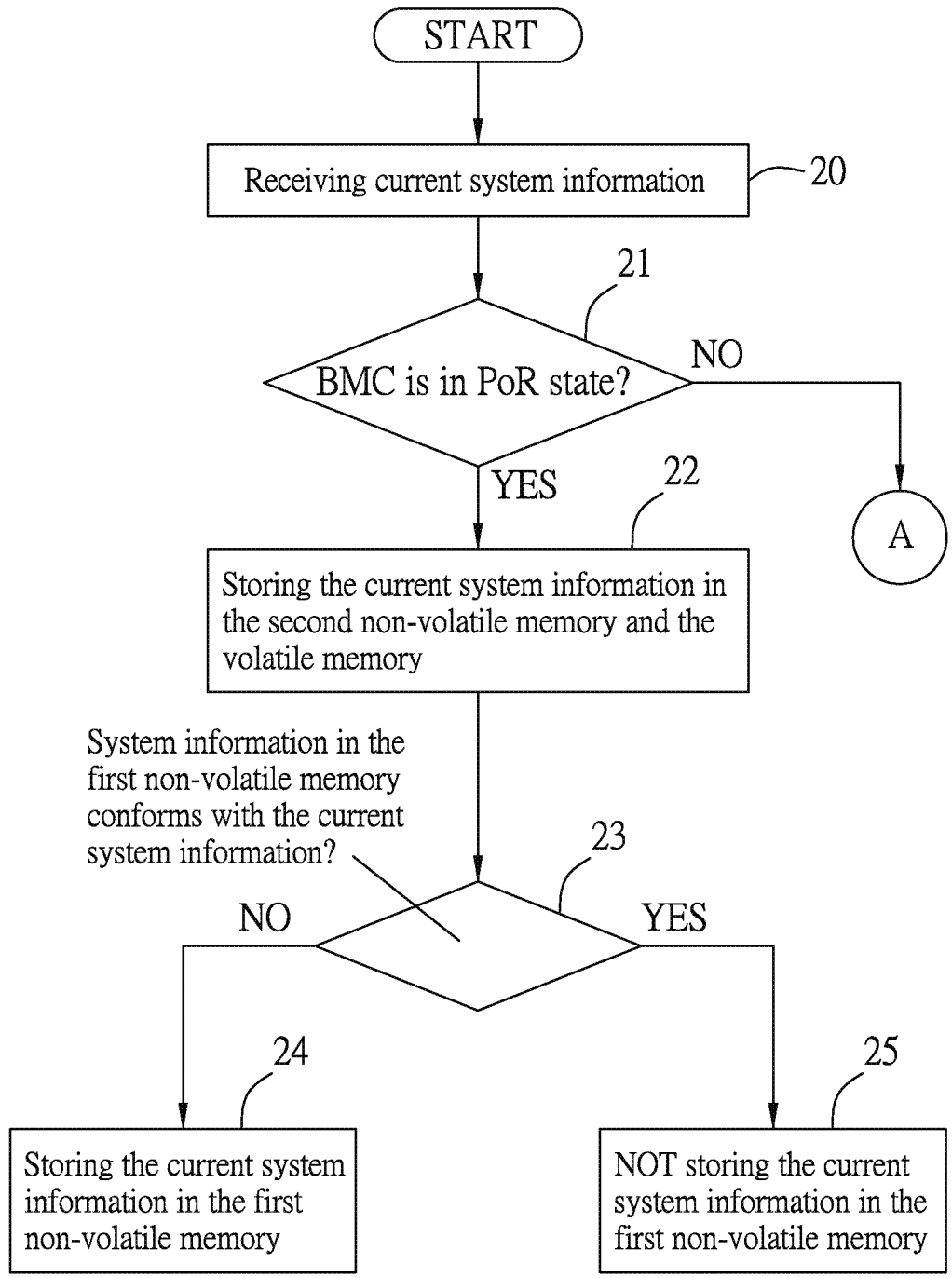
FIGS. 2 and 3 cooperatively illustrate a flow chart of the method for updating system information of the computer device according to an embodiment of the disclosure.
Figure 3:
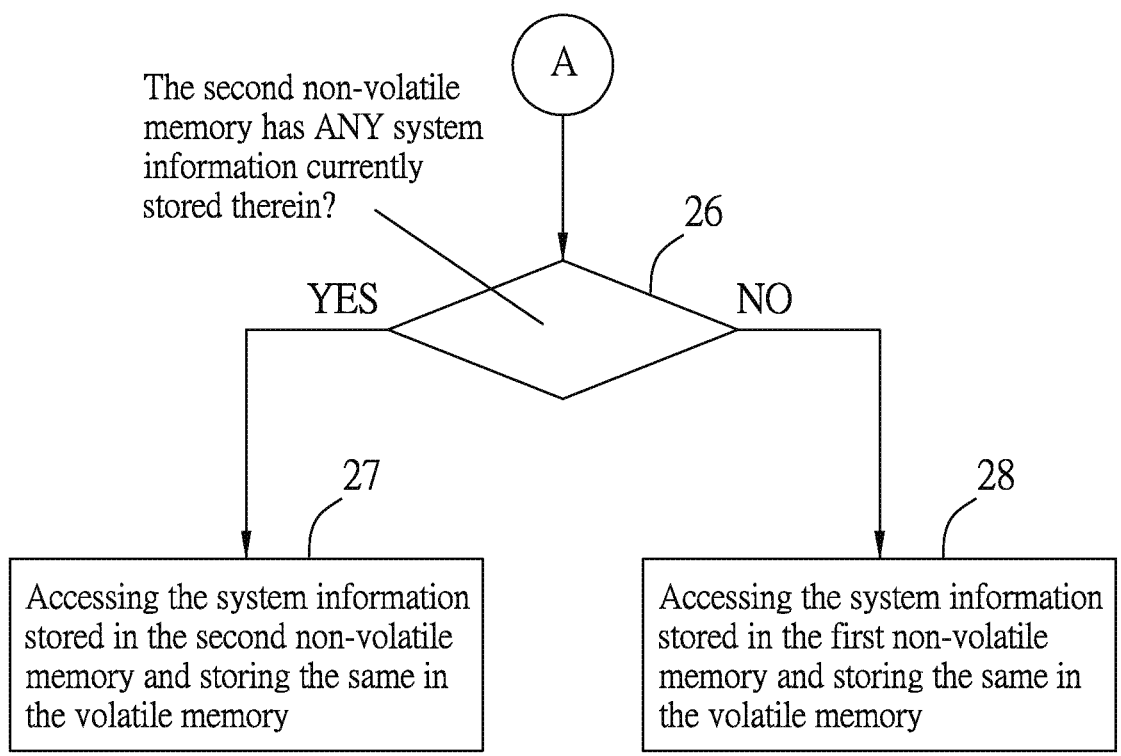

Further referring to FIGS. 2 and 3, the method for updating the system information of the computer device 1 to be implemented by the BMC 11 according to an embodiment of the present disclosure is illustrated.

After the computer device 1 is powered up, the BMC 11 is activated, and the CPU 12 executes the BIOS to obtain current system information associated with the current configuration of the computer device 1. In step 20, the BMC 11 receives the current system information from the CPU 12.

In step 21, the BMC 11 determines whether the BMC 11 is in the PoR state by determining whether the PoR flag is stored with the first flag value or the second flag value, in which the first and second flag values indicate different states of the BMC 11. When the PoR flag is stored with the first flag value, which indicates that the BMC 11 is in the PoR state (i.e., the BMC 11 is activated/started for the first time when the computer device 1 is powered by an alternating current (AC) power supply and is started for the first time), the flow goes to step 22. On the other hand, when the PoR flag is stored with the second flag value, which indicates that the BMC 11 is not in the PoR state (i.e., the BMC 11 is reactivated/restarted after the computer device 1 has been started), the flow goes to step 26. It can be appreciated that steps 20 and 21 are interchangeable or may be simultaneously performed.

In step 22, the BMC 11 stores the current system information in the second non-volatile memory 14 and the volatile memory 111. In this embodiment, the current system information is received by the processing module 112 of the BMC 11 via a keyboard controller style interface (not shown). In some embodiments, the processing module 112 simply writes the current system information in the second non-volatile memory 14 when the second-nonvolatile memory 14 does not have any system information stored therein, and when the second non-volatile memory 14 originally has any system information stored therein, the processing module 112 overwrites the same with the current system information. In this embodiment, since the BMC 11 is in the PoR state, data originally stored in the volatile memory 111 has been lost, and the processing module 112 simply writes the current system information in the volatile memory 111. In some cases, the processing module 112 may store the current system information in the volatile memory 111 to overwrite the system information that is previously stored in the volatile memory 111.

In step 23, the BMC 11 determines whether any system information that is stored in the first non-volatile memory 13 conforms with the current system information. When the determination made in step 23 is negative, the flow goes to step 24. When the determination made in step 23 is affirmative, the flow goes to step 25. When the first non-volatile memory 13 does not have any system information stored therein, the determination in step 23 will also be negative.

When it is determined that the system information stored in the first non-volatile memory 13 does not match the current system information received in step 20, the processing module 112 stores the current system information in the first non-volatile memory 13 as a backup copy in step 24. In this embodiment, the current system information is stored in the first non-volatile memory 13 by overwriting the system information previously stored therein.

When the determination made in step 23 is affirmative, the processing module 112 executes step 25 in which the current system information received in step 20 is not stored in the first non-volatile memory 13 and the system information stored in the first non-volatile memory 13 remains unchanged. By this way, unnecessary wear to the first non-volatile memory 13 (e.g., the EEPROM) resulting from excessive writing and erasing operations can be prevented.

In this embodiment, upon receipt of the current system information, the processing module 112 of the BMC 11 first stores the current system information in the second non-volatile memory 14 in step 22, and then determines whether the current system information conforms with the system information stored in the first non-volatile memory 13 in step 23. It should be noted that the order in which steps 22 and 23 are implemented is not limited to this embodiment. In other embodiments of this disclosure, the order of steps 22 and 23 is interchangeable or steps 22 and 23 may be performed simultaneously.

As shown in FIG. 3, when it is determined in step 21 that the BMC 11 is not in the PoR state, in step 26, the processing module 112 of the BMC 11 determines whether the second non-volatile memory 14 has any system information currently stored therein. When it is determined that the second non-volatile memory 14 currently stores any system information, the flow goes to step 27; otherwise the flow goes to step 28.

In step 27, the processing module 112 of the BMC 11 accesses the system information stored in the second non-volatile memory 14 and stores the system information read from the second non-volatile memory 14 in the volatile memory 111. In this embodiment, the processing module 112 of the BMC 11 accesses the system information from the second non-volatile memory 14 via a serial peripheral interface.

When it is determined that the second non-volatile memory 14 does not store any system information, in step 28, the processing module 112 accesses the system information stored in the first non-volatile memory 13 and stores the same in the volatile memory 111. In this embodiment, the processing module 112 of the BMC 11 accesses the system information in the first non-volatile memory 13 via an inter-integrated circuit ($I^2C$).

It should be noted that in this embodiment, since the second non-volatile memory 14 is a non-volatile memory, a backup of the system information stored therein will not be lost when the BMC 11 is reactivated. During a firmware update operation to the BMC 11 of the computer device 1, the processing module 112 of the BMC 11 erases the system information stored in the second non-volatile memory 14 and the system information stored in the volatile memory 111, and stores an updated version of the firmware in the second non-volatile memory 14. In particular, the system information stored in the volatile memory 111 is erased since the BMC 11 also stores the updated version of firmware into the volatile memory 111. Upon completion of the firmware update operation, the BMC 11 would be reactivated. It should be noted that, since the first non-volatile memory 13 does not store the firmware of the BMC 11, the system information stored in the first non-volatile memory 13 is not erased by the BMC 11 and remains unchanged during the firmware update operation. Accordingly, the BMC 11 can read the latest version of the system information of the computer device 1 from the first non-volatile memory 13 after the reactivation or the firmware update operation of the BMC 11. That is to say, the BMC 11 stores the current system information into the first non-volatile memory 13 (step 24) only when the BMC 11 is in the PoR state.

For example, the system information is stored in the volatile memory 111 in a form of variable, is stored in the second non-volatile memory 14 in a form of a file, and is stored in the first non-volatile memory 13 in a form of raw data. The configuration information of the dual in-line memory included in the system information is, for example, to indicate whether four memory slots A, B, C and D (not shown) are inserted with memory cards. When the memory slots A, C and D but not B are inserted with memory cards, the configuration information of the dual in-line memory (i.e., the system information) is stored in the volatile memory 111 in a variable form of "0b1011", is stored in the second non-volatile memory 14 as a text file recording "A=1, B=0, C=1 and D=1", and is stored in a form of raw data of "1, 0, 1, 1" respectively in four predetermined memory addresses (e.g., 0x10, 0x11, 0x12 and 0x13) in the first non-volatile memory 13.

Whether the BMC 11 is activated for the first time (i.e., in the PoR state) or is reactivated in response to, e.g., the firmware update operation or an IPMI command, the method according to this disclosure can ensure that the volatile memory 111 stores the correct system information associated with the computer device 1. Specifically, in a case that the reactivation of the BMC 11 is not due to the firmware update operation, the BMC 11 accesses the system information stored in the second non-volatile memory 14 and stores the same in the volatile memory 111 in suitable form. In another case that the BMC 11 is reactivated due to the firmware update operation, the BMC 11 accesses the system information from the first non-volatile memory 13 and stores the same in the volatile memory 111. In yet another case that the BMC 11 is started for the first time (i.e., in the PoR state) when the computer device 1 is powered up by the AC power supply, the BMC 11 receives the current system information and stores the current system information in the second non-volatile memory 14 and the volatile memory 111 in respective forms. By this way, the BMC 11 is capable of retrieving the latest version of the system information stored in the volatile memory 111 without requesting the CPU 12 to execute the BIOS again to obtain the system information. Further, since the system information is stored in the volatile memory 111 in the form of variable, reading the system information from the volatile memory 111 is relatively fast.

To sum up, in the present disclosure, the first non-volatile memory 13 and the second non-volatile memory 14 are provided for backing up the system information of the computer device 1. Even after performing the firmware update operation or reactivation of the BMC 11, the BMC 11 is capable of reading the latest version of the system information from the first non-volatile memory 13 or the second non-volatile memory 14 and the reliability of the computer device 1 may be increased.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for updating system information of a server, the method to be implemented by a baseboard management controller (BMC) and comprising steps of:
    a) upon activation of the BMC, determining whether the BMC is in a power on reset (PoR) state, and receiving current system information that is associated with the server from a central processing unit that executes a basic input/output system to obtain the current system information during a power-on self-test process of the server, wherein the server includes the BMC, a first non-volatile memory that stores system information, a second non-volatile memory that stores firmware of the BMC and that is different from the first non-volatile memory, a volatile memory and the central processing unit;
    b) when it is determined that the BMC is in the PoR state, determining whether system information that is stored in the first non-volatile memory of the server conforms with the current system information;
    c) when the determination made in step b) is negative, storing the current system information in the first non-volatile memory; and
    wherein the system information stored in the first non-volatile memory is associated with configuration of the server and configuration information of a field replaceable unit;
said method further comprising:
    when it is determined in step a) that the BMC is not in the PoR state, determining whether the second non-volatile memory has any system information stored therein;
    when it is determined that the second non-volatile memory has system information stored therein, accessing the system information stored in the second non-volatile memory and storing the system information read from the second non-volatile memory in the volatile memory;
    when it is determined that the second non-volatile memory does not have any system information stored therein, accessing the system information stored in the first non-volatile memory and storing the system information thus accessed in the volatile memory; and
    storing the system information thus accessed in the second non-volatile memory when it is determined that the second non-volatile memory does not have any system information stored therein.

2. The method of claim 1, the BMC having a PoR flag being stored with one of a first flag value indicating that the BMC is in the PoR state, and a second flag value different from the first flag value and indicating that the BMC is not in the PoR state,
    wherein step a) includes determining whether the PoR flag is stored with the first flag value or the second flag value, and determining that the BMC is in the PoR state when the PoR flag is stored with the first flag value.

3. The method of claim 1, wherein each of the current system information and the system information stored in the first non-volatile memory includes at least one of configuration information of a dual in-line memory module of the server and configuration information of a peripheral component interconnect of the server.

4. The method of claim 1, wherein the method further comprises a step of:
    when the determination made in step b) is affirmative, not storing the current system information in the first non-volatile memory.

5. The method of claim 1, the BMC including a volatile memory,
    the method further comprising, after step a), a step of storing the current system information in the second non-volatile memory and the volatile memory.

6. The method of claim 1, wherein, in step c), the current system information is stored in the first non-volatile memory to overwrite the system information stored in the first non-volatile memory that does not match the current system information.

7. A server comprising:
    a baseboard management controller (BMC);
    a first non-volatile memory electrically coupled to said BMC, and configured for storing system information associated with configuration of said server and configuration information of a field replaceable unit;
    a second non-volatile memory different from said first non-volatile memory, electrically coupled to said BMC, and storing firmware of said BMC therein;

a volatile memory; and a central processing unit electrically coupled to said BMC, and configured to execute a basic input/output system to obtain current system information during a power-on self-test process of said server;

wherein said BMC is configured to update system information of said server, and is operable to:

receive the current system information that is associated with said server upon activation of said BMC from said central processing unit, determine whether system information that is stored in said first non-volatile memory conforms with the current system information when said BMC is in a power on reset (PoR) state, store the current system information in said first non-volatile memory when the system information stored in said first non-volatile memory does not match the current system information, determine whether said second non-volatile memory has any system information stored therein when said BMC is not in the PoR state, access the system information stored in said second non-volatile memory and store the system information read from said second non-volatile memory in said volatile memory when said second non-volatile memory has system information stored therein, access the system information stored in said first non-volatile memory and store the system information thus accessed in said volatile memory when said second non-volatile memory does not have any system information stored therein, and store the system information thus accessed in said second non-volatile memory when said second non-volatile memory does not have any system information stored therein.

8. The server as claimed in claim 7, wherein said first non-volatile memory is an electrically-erasable programmable read-only memory (EEPROM).

9. The server as claimed in claim 7, wherein said second non-volatile memory is a flash memory.

10. The server as claimed in claim 9, wherein said second non-volatile memory is further for storing the system information.

\* \* \* \* \*